Nov. 18, 1924.         A. C. FREDRICKSON         1,516,008
FOOT LEVER ATTACHMENT
Filed May 16, 1924
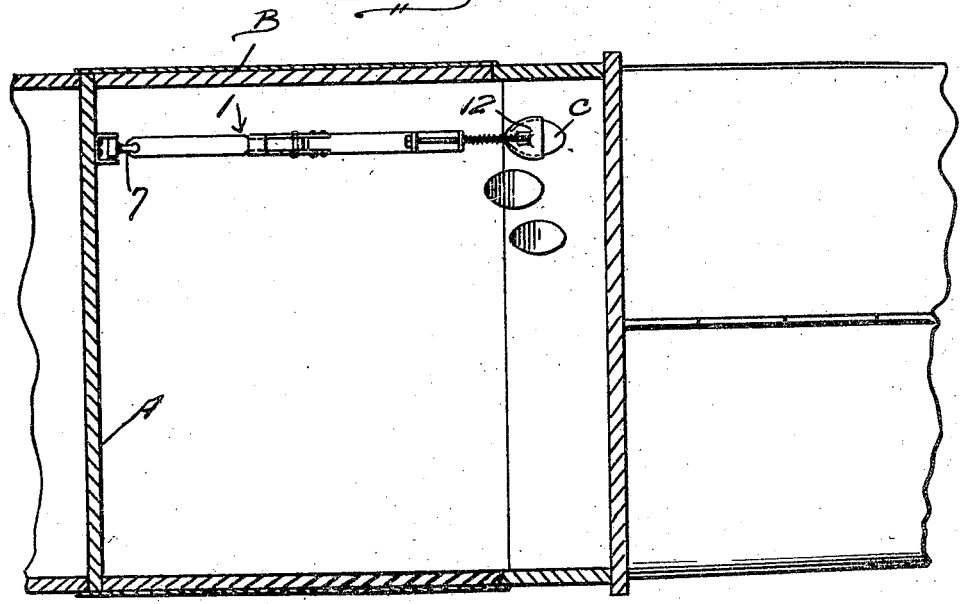
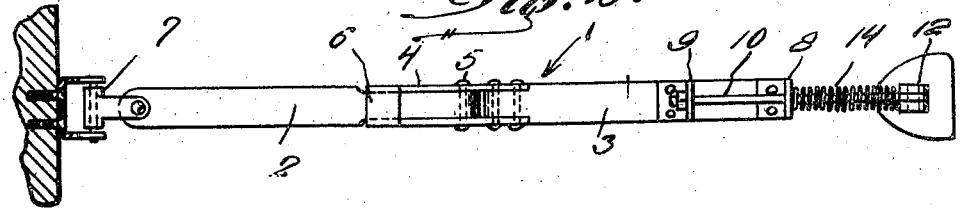
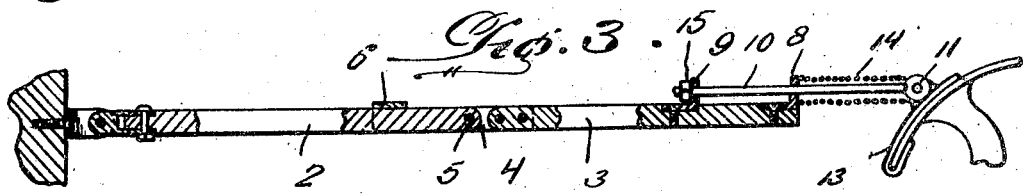
Inventor
A. C. Fredrickson,
By Clarence A. O'Brien
Attorney Patented Nov. 18, 1924.

1,516,008

UNITED STATES PATENT OFFICE.

ANTON C. FREDRICKSON, OF CUSHING, NEBRASKA.

FOOT-LEVER ATTACHMENT.

Application filed May 16, 1924. Serial No. 713,794.

*To all whom it may concern:*

Be it known that I, ANTON C. FREDRICKSON, a citizen of the United States, residing at Cushing, in the county of Howard and State of Nebraska, have invented certain new and useful Improvements in Foot-Lever Attachments, of which the following is a specification.

This invention relates to new and useful improvements in attachments for foot levers, and has for its principal object to provide a device which is especially adapted for use in connection with a Ford automobile, wherein a means is provided for holding the clutch pedal or the foot brake in a depressed position.

A further object of the invention is to provide a foot lever attachment of the above mentioned character, wherein the same may be readily and easily placed in an operative position whenever necessary, the same being further adapted to be swung into an inoperative position, when not in use, which will not interfere with the operation of the foot levers in the usual manner, when the attachment is not in use.

A further object of the invention is to provide a foot lever attachment of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1 is a fragmentary plan view of an automobile, showing my attachment in its operative position.

Figure 2 is a plan view of the attachment, and

Figure 3 is a central longitudinal sectional view thereof, showing the same associated with a foot lever.

Oftentimes, it becomes necessary for the driver of a Ford automobile, to get out of the car, and push the same, in order to pull the same out of the mud. When the driver has not assistance, considerable time and labor is spent, in attempting to move the car out of the mud. In order that a person may efficiently and easily push an automobile, when the same has become stuck, I have provided an attachment, which will hold the clutch pedal in depressed position, whereby the vehicle is placed in gear, thus enabling the same to be more easily moved.

Furthermore, the provision of an attachment of the character to be hereinafter more fully described, when associated with the brake pedal of a Ford automobile, will assist in holding the same against movement, when the vehicle is parked on an inclined surface. Furthermore, when it becomes necessary for the operator of a vehicle to crank the car, when the same is parked on a hill, the provision of an attachment which holds the brake pedal in depressed position will prevent any possibility of the car starting off, after the same has been cranked.

My improved attachment comprises an elongated bar, which includes the pivoted sections 2 and 3, the outer section 3 being provided with a bracket 4, through which extends the transverse pin 5, whereby means is provided for pivoting the section 2 to the section 3. The free end of the bracket 4 is provided with a cross piece 6, which forms a means for limiting the swinging movement of the sections with respect to each other, in one direction, in the manner as is obvious from the construction shown more clearly in Figures 2 and 3 of the drawings.

The elongated bar 1, is swivelly connected at the outer end of the section 2, to the heel board A of the automobile body B, in the manner as clearly shown at 7, in the drawing. The purpose of the swivel connection is to provide a means whereby the attachment may be swung into an operative or inoperative position, as the case may be, in a simple and efficient manner.

Extending upwardly from the outer end of the section 3 is the guide 8, and a similar guide 9 is arranged on the upper face of the outer section 3, inwardly of the guide 8, in the manner as clearly shown in Figures 2 and 3. Extending longitudinally through the guide bracket is the elongated rod 10, the outer end of which is provided with an eye 11, for engagement with the eye portions which extend from the foot lever engaging member 13. Any suitable fastener means is adapted to extend through the registering eye, for securing the foot lever engaging member 13 to the outer end of the rod 10.

A coil spring, such as is shown at 14, encircles the outer end of the rod 10, and is disposed between the outer guide bracket 8, and the connection between the outer end of the rod and the foot lever engaging member 13, in the manner illustrated. The inner end of the rod is threaded and receives thereon the nut 15, whereby the same may be adjusted, so as to regulate the tension of the coil spring 14.

Normally, the attachment is swung to an inoperative position, whereby the same is disposed substantially parallel with the heel board A of the front seat support of the vehicle body B, and the free end of the attachment may be held against movement by any suitable fastening means (not shown). When it is desired to use the attachment for holding the clutch pedal C of a Ford automobile in a depressed position whereby the vehicle may be placed in gear, for the purposes above described, the attachment is swung to the position as shown in the drawing, whereby the foot lever engaging member 13 is in engagement the clutch pedal C, it being understood, of course, that the sections 2 and 3 are disposed at angles with respect to each other. The operator then depresses the hinge of the sections, whereby the same are moved downwardly into the same plane, so as to cause the sections to extend in a horizontal manner, and which enables the foot lever to be depressed and held in such a position, as long as is desired. In order to release the attachment from engagement with the foot lever, which has been depressed, the sections are pulled upwardly and the same will move into engagement with respect to each other, on the pivot 5, whereby the foot lever engaging member 13 is disengaged from the foot pedal, and enables the attachment to again be swung to an inoperative position. It is of course to be understood that the swivel connection 7 enables the attachment to be swung in the various positions.

As stated above, the attachment may be used either in connection with the clutch pedal or the foot brake of a Ford automobile, and when in use, the same will efficiently hold the lever in a depressed position.

When the attachment is not in use, the same will not interfere with the ordinary control of the foot lever by the operator. The simplicity of my device enables the same to be readily and easily placed in an operative or inoperative position, for the purpose of carrying out the objects for which the same is designated, and furthermore the parts are of such a construction as to render the same strong and durable.

While I have shown the preferred embodiment of my invention, it is to be understood that various changes in the size, shape, and arrangement of parts may be resorted to, without departing from the spirit of the invention and the scope of the appended claims.

Having thus described my invention, what I claim is:

1. In combination with the foot pedal of an automobile, an attachment connected to the heel board of the seat support of the automobile adapted for engagement with the foot pedal for holding the same in a depressed position, said attachment comprising a pair of pivotally connected sections, means for limiting the swinging movement of said sections in one direction with respect to each other, a swivel connection between the end of one section and the heel board of the seat support of the automobile, and a foot pedal engaging member carried by the outer end of the other section.

2. In combination with the foot pedal of an automobile, an attachment connected to the heel board of a seat support of the automobile adapted for engagement with the foot pedal for holding the same in a depressed position, said attachment comprising a pair of pivotally connected sections, means for limiting the swinging movement of said sections in one direction with respect to each other, a swivel connection between the end of one section and the heel board of the seat support of the automobile, a foot pedal engaging member carried by the outer end of the other section, and means associated with the foot pedal engaging member and the section supporting the same for regulating the tension of the foot pedal engaging member.

3. In combination with the foot pedal of an automobile, a bar comprising a pair of pivotally connected sections, a swivel connection between the outer ends of one of the bars, and the heel board of the front seat support of the vehicle body, and guide brackets supported on the outer end of the other section, a rod extending through said bracket and connected at its outer end to a foot pedal engaging member, the inner end of the rod being threaded, a nut associated therewith, and a coil spring disposed between the foot lever engaging member and the outermost guide bracket.

In testimony whereof I affix my signature.

ANTON C. FREDRICKSON.